(12) United States Patent
Chang et al.

(10) Patent No.: US 12,399,374 B2
(45) Date of Patent: Aug. 26, 2025

(54) HEAD-MOUNTED DISPLAY DEVICE

(71) Applicant: HTC Corporation, Taoyuan (TW)

(72) Inventors: Li-Hsun Chang, Taoyuan (TW);
Kuan-Ying Ou, Taoyuan (TW);
Chen-Fu Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 562 days.

(21) Appl. No.: 17/857,187

(22) Filed: Jul. 5, 2022

(65) Prior Publication Data
US 2024/0012253 A1    Jan. 11, 2024

(51) Int. Cl.
G02C 5/22    (2006.01)
G02B 27/01    (2006.01)

(52) U.S. Cl.
CPC ........... G02B 27/0176 (2013.01); G02C 5/22 (2013.01); G02C 5/2209 (2013.01); G02C 2200/32 (2013.01)

(58) Field of Classification Search
CPC ................ G02C 5/22; G02C 5/2209
See application file for complete search history.

(56) References Cited

U.S. PATENT DOCUMENTS

| | | | | |
|---|---|---|---|---|
| 4,618,226 A | * | 10/1986 | Sartor | G02C 5/2254 351/111 |
| 5,818,567 A | | 10/1998 | Sakai | |
| 6,183,080 B1 | * | 2/2001 | Negishi | G02C 5/2263 351/120 |
| 9,678,360 B2 | * | 6/2017 | Young | G02C 5/2254 |
| 2013/0128220 A1 | * | 5/2013 | Chen | G02C 5/146 351/121 |
| 2015/0103152 A1 | | 4/2015 | Qin | |
| 2023/0359047 A1 | * | 11/2023 | Liu | G02B 27/0176 |
| 2024/0184134 A1 | * | 6/2024 | Anderson | G02C 5/2218 |

FOREIGN PATENT DOCUMENTS

| | | | | |
|---|---|---|---|---|
| CN | 210666234 U | * | 6/2020 | |
| CN | 113623520 A | * | 11/2021 | ............. F16M 13/04 |
| CN | 216351568 | | 4/2022 | |
| CN | 216696864 | | 6/2022 | |
| CN | 112558310 B | * | 1/2023 | ......... G02B 27/0176 |
| TW | M606162 | | 1/2021 | |
| WO | 2022066763 | | 3/2022 | |

OTHER PUBLICATIONS

"Office Action of Taiwan Counterpart Application", issued on Jul. 28, 2023, pp. 1-5.

* cited by examiner

Primary Examiner — Christopher Stanford
(74) Attorney, Agent, or Firm — JCIPRNET

(57) ABSTRACT

A head-mounted display device includes a main body and a supporter. The main body has a connection portion. The supporter is pivotally connected to the connection portion by taking an axis as a rotation axis. There is a first gap between the supporter and the connection portion on one side away from a user's head. A width of the first gap remains constant during rotation of the supporter relative to the connection portion.

10 Claims, 6 Drawing Sheets

HEAD-MOUNTED DISPLAY DEVICE

TECHNICAL FIELD

The disclosure relates to a head-mounted display device, and more particularly, to a head-mounted display device with a supporter.

DESCRIPTION OF RELATED ART

In recent years, due to the booming development of virtual reality (VR), augmented reality (AR) and mixed reality (MR) technologies, head-mounted display devices that utilize these technologies are becoming increasingly popular in the market. Typical head-mounted display devices use a hinge to adjust the two sides of the device closer to or away from each other in order to adapt to the head size of different users. However, the exposed gap of the hinge of typical head-mounted display devices is too large and may change as the hinge rotates, which leads to unattractive appearance. Although there are also head-mounted display devices that cover the hinge with an appearance so that the hinge is then hidden, an additional appearance is required, which increases the manufacturing cost.

SUMMARY

The disclosure provides a head-mounted display device that maintains an attractive appearance.

The head-mounted display device of the disclosure includes a main body and a supporter. The main body has a connection portion. The supporter is pivotally connected to the connection portion by taking an axis as a rotation axis. There is a first gap between the supporter and the connection portion on one side away from a user's head. A width of the first gap remains constant during rotation of the supporter relative to the connection portion.

Based on the above, in the head-mounted display device of the disclosure, the width of the first gap remains constant, thereby increasing the attractiveness of the appearance.

DESCRIPTION OF EMBODIMENTS

Figure 1:
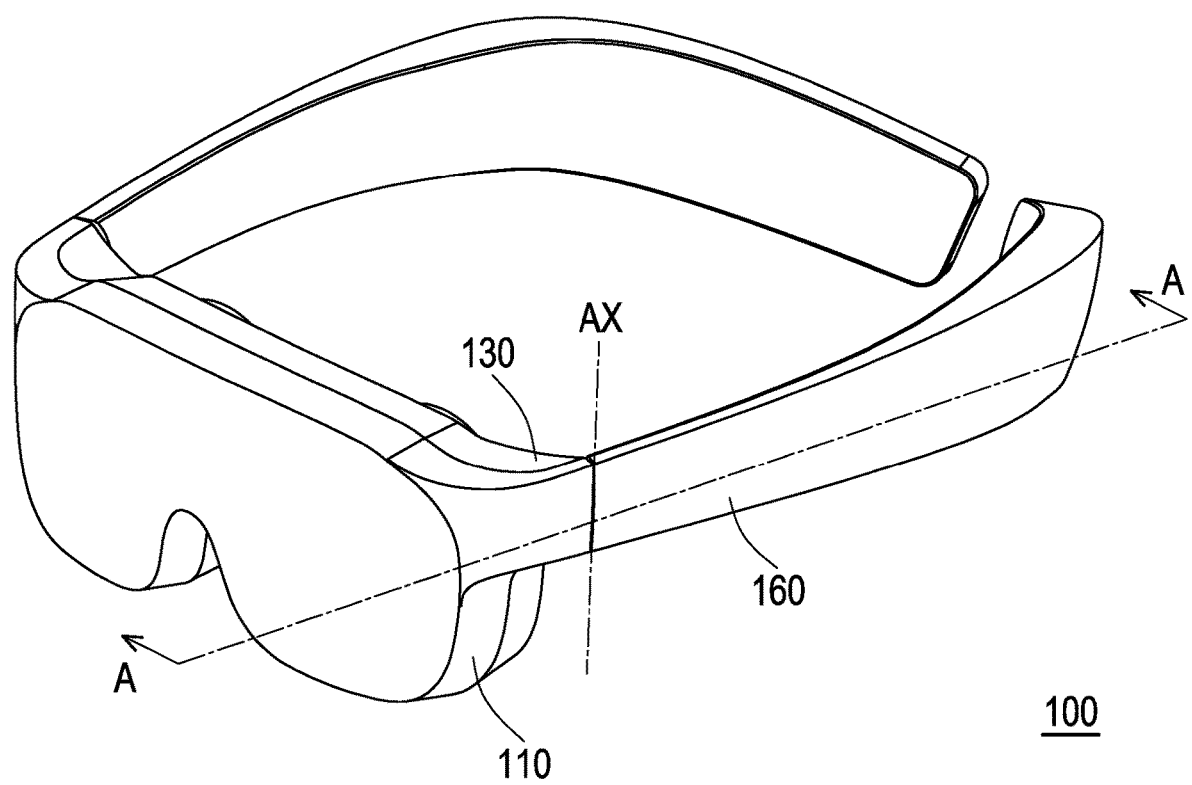
FIG. 1 is a schematic view of a head-mounted display device of an embodiment of the invention.

FIG. 1 is a schematic view of a head-mounted display device of an embodiment of the invention. Referring to FIG. 1, the head-mounted display device 100 of the embodiment includes a main body 110. When a user wears the head-mounted display device 100 on a user's head 50 with the main body 110 covering eyes of the user, the user may view the image displayed by the main body 110 conveniently. The image source of the head-mounted display device 100 may be a built-in display system or an external display device such as a smartphone, but the image source is not limited thereto. The image type displayed by the head-mounted display device 100 is, for example, virtual reality, augmented reality, or mixed reality, but the display type is not limited thereto.

Figure 2:
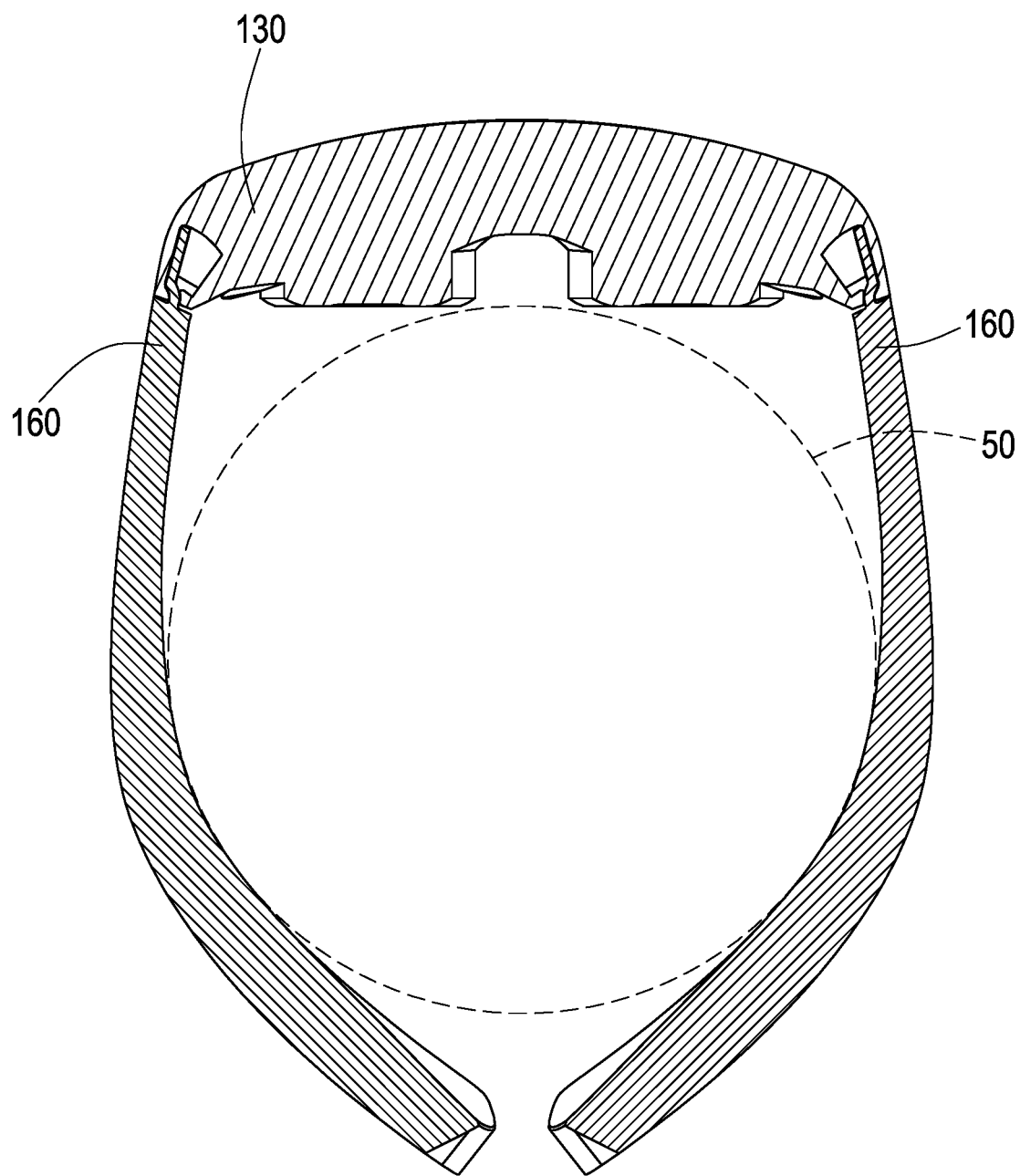
FIG. 2 is a top sectional view of the head-mounted display device of FIG. 1 along a profile line A-A.

FIG. 2 is a top sectional view of the head-mounted display device of FIG. 1 along a profile line A-A. Referring to FIG. 1 and FIG. 2, in this embodiment, the head-mounted display device 100 further includes a supporter 160. The main body 110 has a connection portion 130. The supporter 160 is coupled to the connection portion 130 by taking an axis AX as a rotation axis. The number of the supporters 160 and the connection portions 130 of the embodiment is two, which are respectively located on the left and right sides of the head-mounted display device 100, that is, on the left and right sides of the user's head 50, but the disclosure is not limited thereto. By pivotally connecting the supporter 160 to the connection portion 130, the two supporters 160 may be brought close to or away from each other, so as to adapt to the head size of different users. For example, if the user's head is relatively small, the two supporters 160 are brought closer to each other to better fit the user's head 50, and vice versa.

Figure 3A:
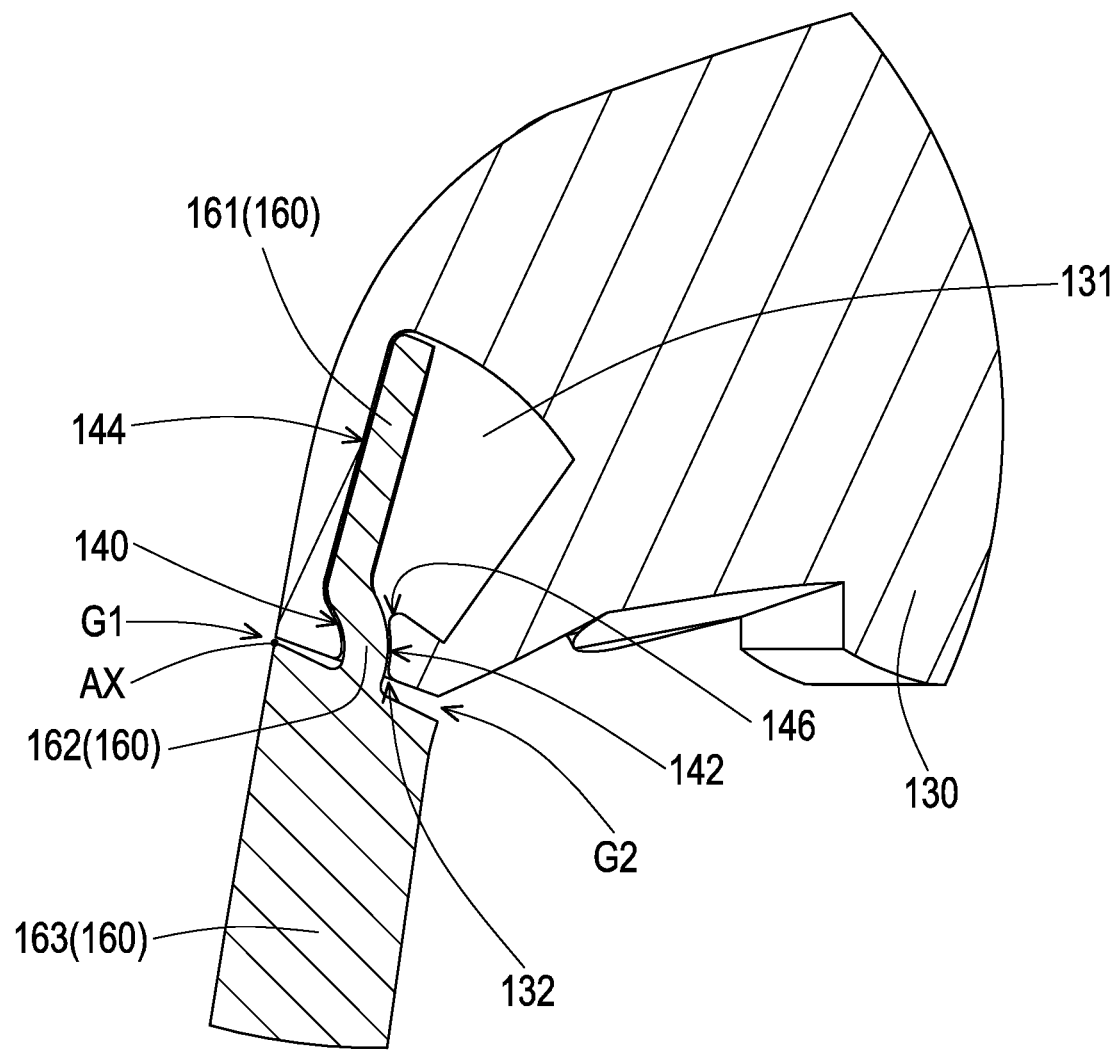
FIG. 3A is a partial enlarged view of the vicinity of the connection portion of FIG. 2.
Figure 3B:
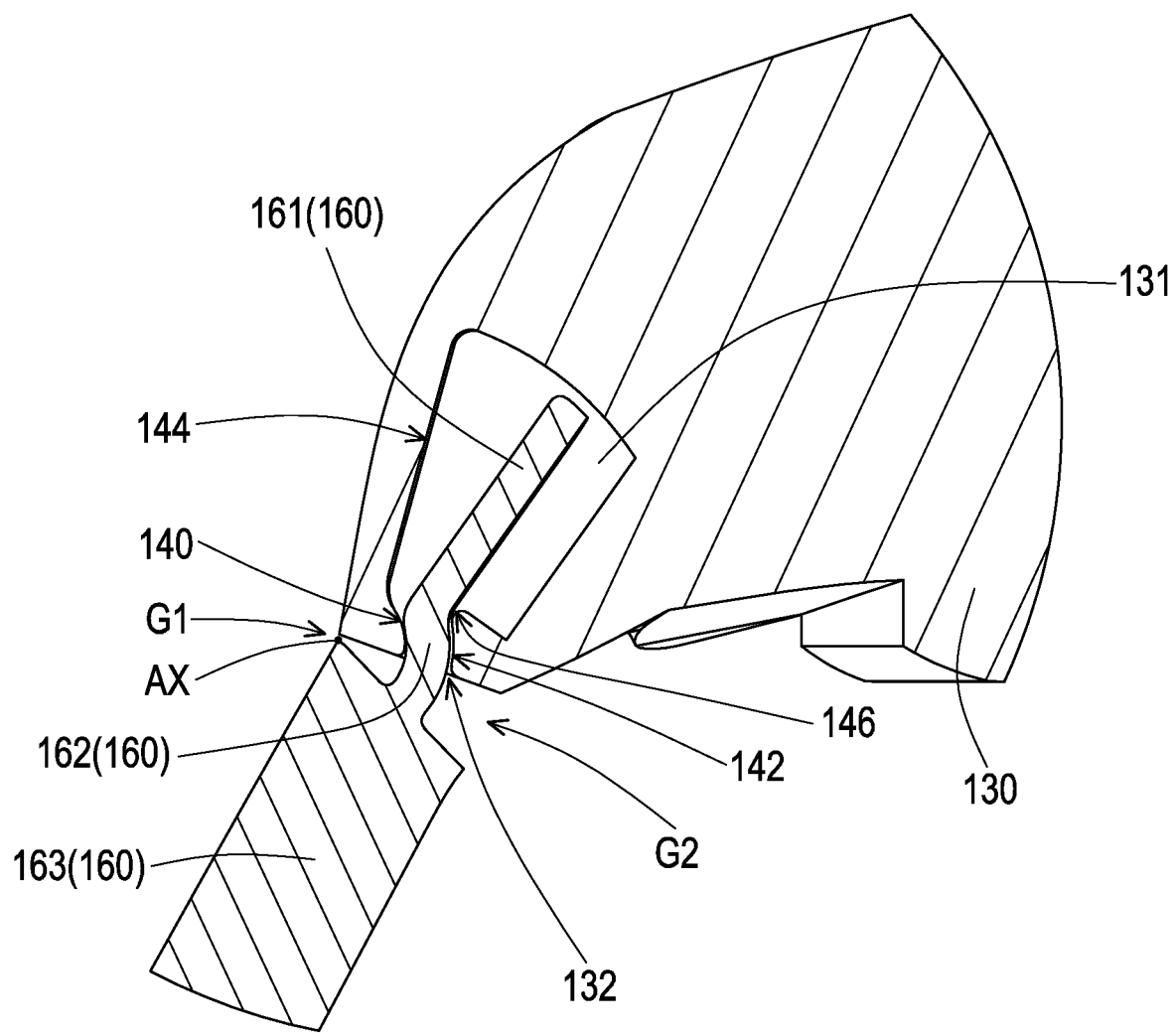
FIG. 3B is a partial enlarged view of the supporter of FIG. 3A rotated to another position.

FIG. 3A is a partial enlarged view of FIG. 2. FIG. 3B is a partial enlarged view of FIG. 3A rotated to another position. Referring to FIG. 3A, in this embodiment, there is a first gap G1 between the supporter 160 and the connection portion 130 on one side away from the user's head 50 (FIG. 2), and there is a second gap G2 between the supporter 160 and the connection portion 130 on one side close to the user's head 50, while the first gap G1 and the second gap G2 are opposite to each other. In other words, the first gap G1 is located at the outer boundary of the supporter 160 and the connection portion 130, while the second gap G2 is located at the inner boundary of the supporter 160 and the connection portion 130.

The axis AX is located on one side of the supporter 160 close to the connection portion 130 and is one side of the first gap G1. Therefore, the width of the first gap G1 remains constant during the rotation of the supporter 160 relative to the connection portion 130. In other words, when the user adjusts the head-mounted display device 100, the width of the first gap G1 remains constant.

Since the head-mounted display device 100 does not use a typical hinge as a rotating mechanism, the supporter 160 may be extremely close to the connection portion 130. That is, the width of the first gap G1 may be very small, i.e. the supporter 160 is closely adjacent to the connection portion 130. As the width of the first gap G1 may be very small and remain constant when the supporter 160 is rotated, such a design allows the head-mounted display device 100 to maintain an attractive appearance and greatly reduce the possibility of pulling the user's hair.

In this embodiment, the supporter 160 has a restricted segment 161, a connection segment 162, and a free segment 163. The connection segment 162 is arc-shaped and connects the restricted segment 161 and the free segment 163. For example, the supporter 160 is integrally formed, but the structure of the supporter 160 is not limited thereto.

In this embodiment, the connection portion 130 has a chamber 131 and a chamber opening 132, and the supporter 160 passes through the chamber 131 through the chamber opening 132. When the supporter 160 passes through the chamber 131, the restricted segment 161 is located in the chamber 131. The connection segment 162 passes through the chamber opening 132 and is able to slide relative to the chamber opening 132. The free segment 163 is exposed outside the chamber 131.

The size of the chamber 131 and the diameter of the chamber opening 132 may be adjusted according to design requirements, which are not limited in the disclosure.

In this embodiment, when the connection segment 162 slides relative to the chamber opening 132, the shapes of the connection segment 162 and the chamber opening 132 match with each other, so that the entire supporter 160 rotates around the axis AX.

Specifically, referring to FIG. 3A and FIG. 3B, the chamber 131 has a first curved wall surface 140, a second curved wall surface 142, a first wall surface 144, and a second wall surface 146. The first curved wall surface 140 and the second curved wall surface 142 are opposite to each other and are located on two sides of the chamber opening 132 respectively. The first curved wall surface 140 is convex and is connected to the first wall surface 144 on one side away from the user's head 50 (FIG. 2). The second curved wall surface 142 is concave and is connected to the second wall surface 146 on one side close to the user's head 50 (FIG. 2). The shape of the first curved wall surface 140 and the shape of the second curved wall surface 142 correspond to each other.

In this embodiment, the connection segment 162 is slidably disposed between the first curved wall surface 140 and the second curved wall surface 142. The restricted segment 161 is limited between the first wall surface 144 and the second wall surface 146. If the user's head is relatively big, the user may exert force on the supporter 160. A part of the connection segment 162 then slides out of the chamber opening 132 along the first curved wall surface 140 and the second curved wall surface 142, so that the free segment 163 of the supporter 160 moves outward. That is, by moving to the left side of the supporter 160 in FIG. 3A and FIG. 3B, the distance between the two supporters 160 is increased to better fit the large head size.

When the restricted segment 161 contacts the second wall surface 146, the second wall surface 146 stops the supporter 160, and the supporter 160 stops rotating in time.

Similarly, if the user's head is relatively small, the user may exert force on the supporter 160 in an opposite direction. The connection segment 162 then slides into the chamber opening 132 along the first curved wall surface 140 and the second curved wall surface 142, so that the free segment 163 of the supporter 160 moves inward. That is, by moving to the right side of the supporter 160 in FIG. 3A and FIG. 3B, the distance between the two supporters 160 is decreased to better fit the small head size.

When the restricted segment 161 contacts the first wall surface 144, the first wall surface 144 stops the supporter 160, and the supporter 160 stops rotating in time.

Figure 4A:
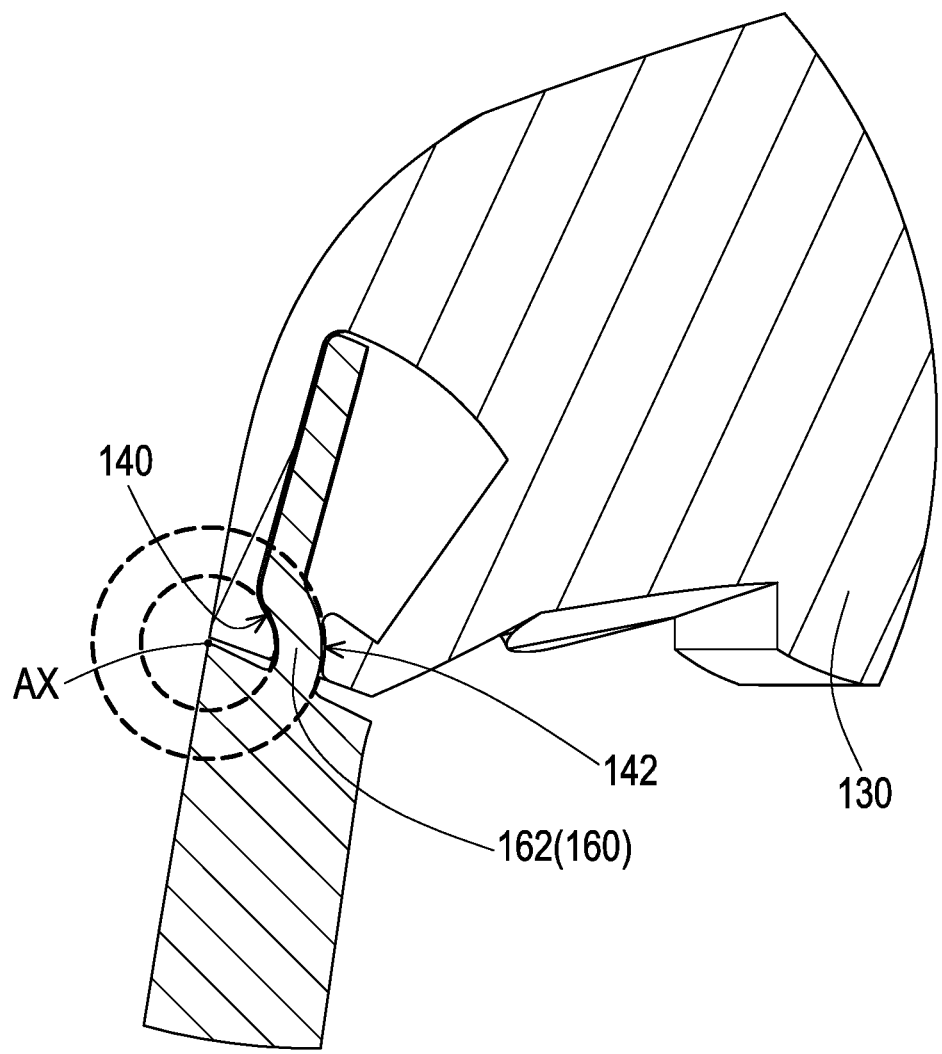
FIG. 4A is a partial enlarged view of the vicinity of the connection portion of FIG. 2.
Figure 4B:
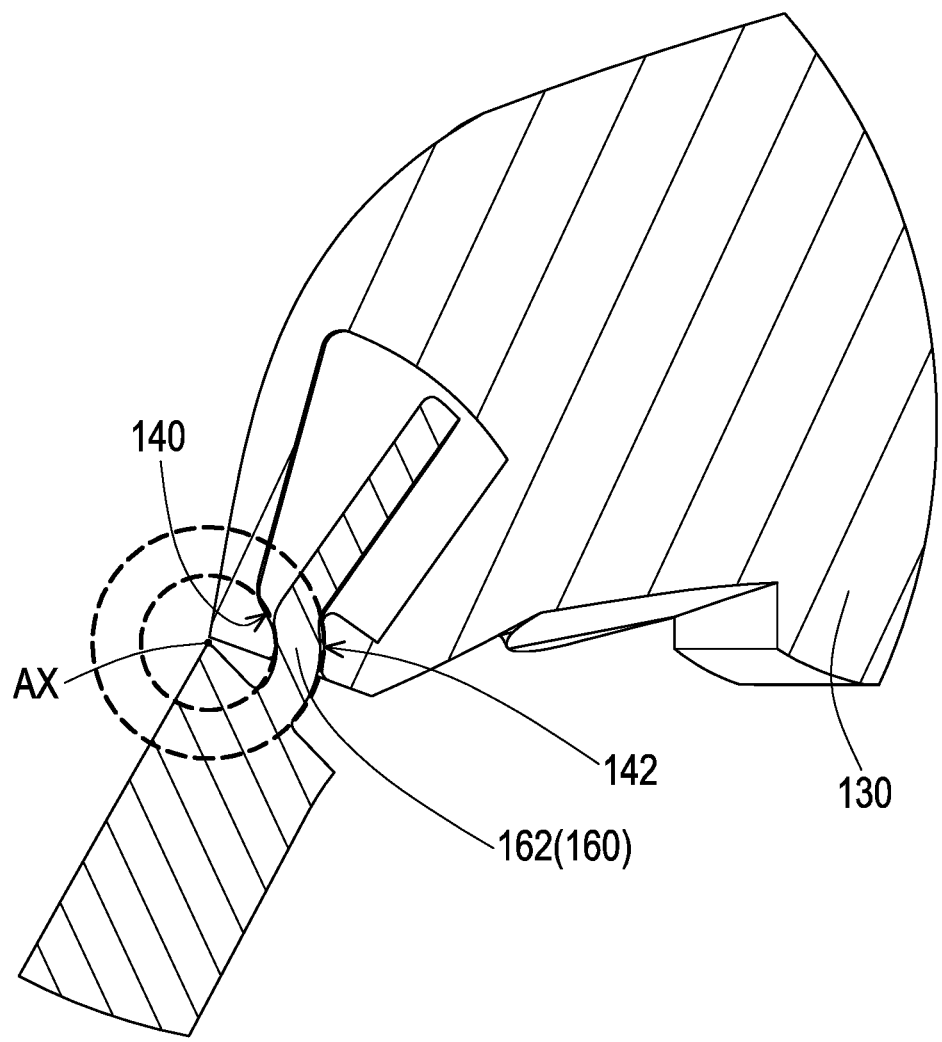
FIG. 4B is a partial enlarged view of the supporter of FIG. 3A rotated to another position.

FIG. 4A is a partial enlarged view of the vicinity of the connection portion of FIG. 2. FIG. 4B is a partial enlarged view of the supporter of FIG. 3A rotated to another position. In addition, referring to FIG. 4A and FIG. 4B, the radius of curvature of the first curved wall surface 140 is the radius of the bigger circle represented by the dotted line, while the radius of curvature of the second curved wall surface 142 is the radius of the smaller circle represented by the dotted line, and the two circles are centered on the axis AX. That is to say, the curvature centers of the first curved wall surface 140 and the second curved wall surface 142 are both located on the axis AX. On the other hand, the connection segment 162 matches the shapes of the first curved wall surface 140 and the second curved wall surface 142, so the curvature center of the connection segment 162 is also located on the axis AX. In other words, the curvature centers of the connection segment 162, the first curved wall surface 140, and the second curved wall surface 142 of this embodiment are all located on the axis AX. In this way, the connection segment 162 can rotate smoothly between the first curved wall surface 140 and the second curved wall surface 142 without causing structural interference with the connection portion 130.

It should be noted that, conventional head-mounted display devices take a hinge as the rotation center, so as to make adjustment to fit the head shapes of different users. In contrast, the head-mounted display device 100 of this embodiment is slidably disposed between the two curved wall surfaces through the supporter 160, taking the virtual axis as the rotation center without using any hinge, thereby achieving the effect of smooth rotation.

Referring to FIG. 3A and FIG. 3B, on the other hand, the width of the second gap G2 gradually increases or decreases as the supporter 160 rotates relative to the connection portion 130. The width of the second gap G2 has a minimum value when the restricted segment 161 is abutted against the first wall surface 144. Conversely, the width of the second gap G2 has a maximum value when the restricted segment 161 is abutted against the second wall surface 146.

In this embodiment, the width of the second gap G2 is greater than zero, that is, the supporter 160 and the connection portion 130 do not contact each other inside the head-mounted display device 100. Therefore, even if the user's hair falls in the second gap G2, the hair does not get pulled, which prevents the user from feeling pain or discomfort due to hair pulling. The user experience is thus enhanced.

In addition, the minimum width of the second gap G2 of this embodiment is, for example, greater than or equal to the width of the first gap G1. Certainly, the size relationship between the width of the first gap G1 and the minimum width of the second gap G2 is not limited thereto, but depends on the design requirements.

In addition, the second gap G2 is located inside the head-mounted display device 100, that is, the side close to the user's head 50. Therefore, when the user wears the head-mounted display device 100, even if the width of the second gap G2 is greater than the width of the first gap G1, the second gap G2 is less likely to be seen and affect the appearance.

Compared with conventional head-mounted display devices, the outer gap of the head-mounted display device 100 of the embodiment is extremely small and the width thereof remains constant during rotation, so that the overall attractive appearance is well maintained. Meanwhile, since the width of the outer gap and the minimum width of the inner gap of the head-mounted display device 100 are not zero, the user's hair is not pulled even if the user's hair falls in the outer gap or the inner gap.

In addition, in this embodiment, the material of the connection portion 130 is, for example, metal, but the material is not limited thereto as long as the connection portion 130 has sufficient structural strength. In this way, the chamber opening 132 is prevented from being deformed by the supporter 160, causing the rotation axis of the supporter 160 to deviate from the preset axis AX. The width of the first gap G1 is also ensured to remain constant when the supporter 160 rotates, preventing the hair from being pulled.

Based on the above, in the head-mounted display device of the disclosure, the width of the first gap remains constant during the rotation of the supporter relative to the connection portion. Therefore, the width of the first gap is extremely small and remains constant, thereby increasing the attractiveness of the appearance. In addition, when the width of the second gap is designed to be greater than zero, the user's hair is not pulled by the connection portion and the supporter, which prevents the user from feeling pain or discomfort due to hair pulling. The user experience is thus enhanced.

What is claimed is:

1. A head-mounted display device, comprising:
a main body having a connection portion; and
a supporter, pivotally connected to the connection portion by taking an axis as a rotation axis, wherein there is a first gap between the supporter and the connection portion on one side away from a user's head, and a width of the first gap remains constant during rotation of the supporter relative to the connection portion, and wherein an edge of the supporter is located on the axis, and the edge of the supporter remains positioned on the axis during rotation of the supporter relative to the connection portion.

2. The head-mounted display device according to claim 1, wherein the connection portion has a chamber and a chamber opening, and the supporter passes through the chamber through the chamber opening.

3. The head-mounted display device according to claim 2, wherein the chamber opening has a first curved wall surface and a second curved wall surface opposite to each other, the supporter has a connection segment, and the connection segment is slidably disposed between the first curved wall surface and the second curved wall surface.

4. The head-mounted display device according to claim 3, wherein the first curved wall surface is convex and is located on one side of the chamber away from the user's head.

5. The head-mounted display device according to claim 3, wherein a curvature center of the connection segment, the first curved wall surface, and the second curved wall surface are located on the axis.

6. The head-mounted display device according to claim 3, wherein the chamber has a first wall surface and a second wall surface, the first wall surface connects the first curved wall surface, the second wall surface connects the second curved wall surface, the supporter further comprises a restricted segment, and the restricted segment is limited between the first wall surface and the second wall surface.

7. The head-mounted display device according to claim 6, wherein the restricted segment connects the connection segment and is located in the chamber, there is a second gap between the supporter and the connection portion on one side close to the user's head, and a width of the second gap has a minimum value when the restricted segment is abutted against the first wall surface.

8. The head-mounted display device according to claim 6, wherein the restricted segment connects the connection segment and is located in the chamber, there is a second gap between the supporter and the connection portion on one side close to the user's head, and a width of the second gap has a maximum value when the restricted segment is abutted against the second wall surface.

9. The head-mounted display device according to claim 1, wherein the axis is located on one side of the supporter close to the connection portion and is located on one side of the first gap.

10. The head-mounted display device according to claim 1, wherein there is a second gap between the supporter and the connection portion on one side close to the user's head, and a width of the second gap is greater than zero.

* * * * *